T. HOOCK.
WINDING FOR INDUCTION MOTORS.
APPLICATION FILED SEPT. 6, 1910.

1,112,452.

Patented Oct. 6, 1914.

UNITED STATES PATENT OFFICE.

THEODORE HOOCK, OF EAST McKEESPORT, PENNSYLVANIA, ASSIGNOR TO WESTINGHOUSE ELECTRIC AND MANUFACTURING COMPANY, A CORPORATION OF PENNSYLVANIA.

WINDING FOR INDUCTION-MOTORS.

1,112,452.   Specification of Letters Patent.   Patented Oct. 6, 1914.

Application filed September 6, 1910. Serial No. 580,766.

*To all whom it may concern:*

Be it known that I, THEODORE HOOCK, a subject of the Emperor of Germany, and a resident of East McKeesport, in the county of Allegheny and State of Pennsylvania, have invented a new and useful Improvement in Windings for Induction-Motors, of which the following is a specification.

My invention relates to windings for dynamo-electric machines and particularly to squirrel-cage windings for induction motors.

The object of my invention is to provide a squirrel-cage winding for induction motors that may be made from a single sheet of conducting material, and which may be readily and economically manufactured and applied.

Figure 1:
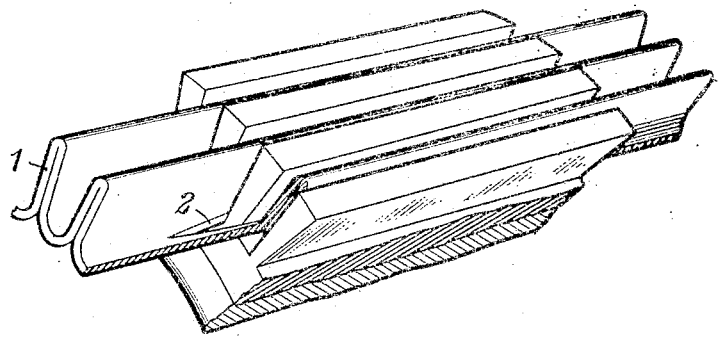
Figure 2:
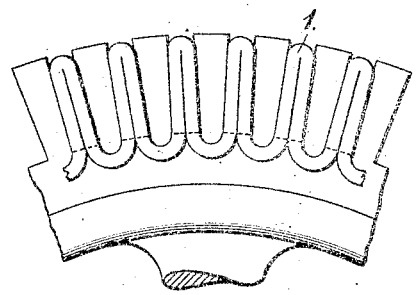
Figure 3:
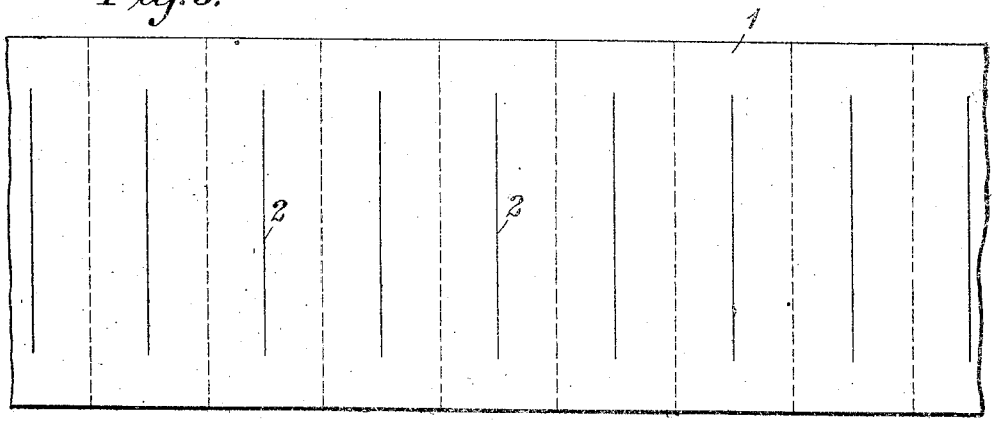
Figure 4:
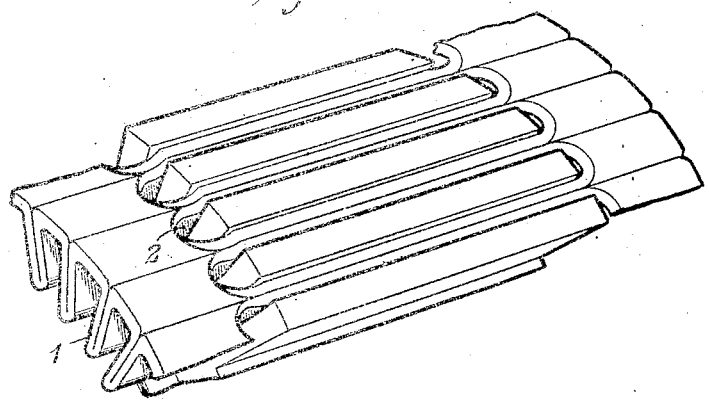

Figure 1 of the accompanying drawing is a perspective view of a portion of the secondary member of an induction motor having a winding constructed in accordance with the present invention. Fig. 2 is an end view of the parts shown in Fig. 1. Fig. 3 is a plan view, on a reduced scale, of the blank from which the winding of Figs. 1 and 2 is made. Fig. 4 is a perspective view of a portion of a modified form of secondary member.

The present winding is adapted to be applied to a peripherally toothed and slotted core, and, in its original condition, consists of a sheet 1 of copper or other suitable conducting material (Fig. 3) that is provided, at intervals, with transverse slits 2 extending partially across the same and intermediate its edges, the slits being preferably slightly longer than the core-teeth to which the winding is to be applied. After being provided with the transverse slits, the blank is transversely bent to form folds between the slits that extend from edge to edge, after which the edges of the slits are spread apart. The formed blank is then bent into substantially cylindrical form, and is applied to the slotted core with the core teeth projecting through the widened slits. The folded portions of the sheet material that occupy the slots or spaces between the core teeth constitute the conductor bars of the winding and may be compressed to effect a close contact between their inner faces. The close-contact relation may, of course, obtain also throughout the lengths of the folds, as indicated in the drawings, if desired. Since the slits do not extend entirely across the sheet material, the unslitted end portions that are in alinement with the core teeth serve, in conjunction with the ends of the folded portions, as end rings for the conductor bars. The ends of the sheet are, of course, soldered, or riveted, or otherwise secured together after the winding has been applied to the core.

In Fig. 1, the slits in the conducting sheet comprising the winding are located near the inner ends of the core teeth, but, if desired, they may be located near their outer ends, as shown in Fig. 4, the sheet being also indicated in the last named figure as having slits that terminate in enlarged openings formed by cutting away portions of the metal.

The winding may also be made from a plurality of sheets, if desired, which may be fastened together, either before or after application to the core, and many other modifications of the winding may obviously be made within the spirit and scope of the invention as set forth in the appended claims.

I claim as my invention:

1. A closed-circuit winding for electrical devices consisting of a sheet of conducting material having transverse slits extending partially across it and folds extending from edge to edge between the slits.

2. A closed-circuit winding for electrical devices consisting of a transversely slitted sheet having transverse folds between the slits.

3. A closed-circuit winding for electrical devices consisting of a transversely slitted sheet having folds between the slits, the inner faces of which are in close contact.

4. A closed-circuit winding for electrical devices consisting of a sheet provided with transverse slits extending only partially across the same and intermediate its edges and having folds between the slits.

5. A closed-circuit winding for electrical devices consisting of a sheet provided with transverse slits extending only partially across the same and intermediate its edges and having folds between the slits, the inner faces of which are in close contact.

6. A closed-circuit winding for electrical devices consisting of a sheet provided with expanded transverse slits extending only partially across the same and intermediate its edges and having transverse folds between the slits.

7. In a dynamo-electric machine, the combination with a toothed core, of a winding therefor consisting of a sheet having transverse slits through which the core teeth project and folds extending from edge to edge between and beyond the core teeth.

8. In a dynamo-electric machine, the combination with a toothed core, of a winding therefor consisting of a sheet having transverse slits extending only partially across the same and intermediate its edges and folds extending from edge to edge and located between the core teeth.

9. In a dynamo-electric machine, the combination with a toothed core, of a winding therefor consisting of a sheet having transverse slits through which the core teeth project and provided with folds between the teeth the inner faces of which are in close contact.

10. In a dynamo-electric machine, the combination with a toothed core, of a winding therefor consisting of a sheet provided with transverse expanded slits through which the teeth project and having folds between the slits that extend from edge to edge and the inner faces of which are in close contact.

In testimony whereof, I have hereunto subscribed my name this 18th day of August, 1910.

THEODORE HOOCK.

Witnesses:
C. W. McGhee,
R. J. Dearborn.